Nov. 25, 1969        J. B. GILL        3,480,270
APPARATUS FOR GRIPPING A PIPE
Filed Nov. 19, 1965        2 Sheets-Sheet 1
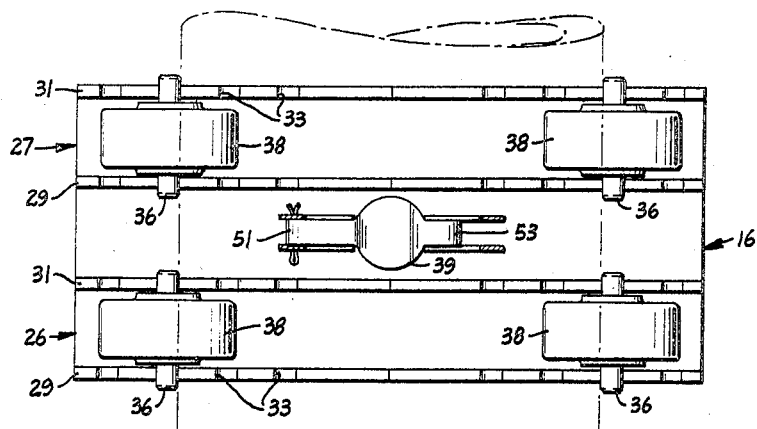
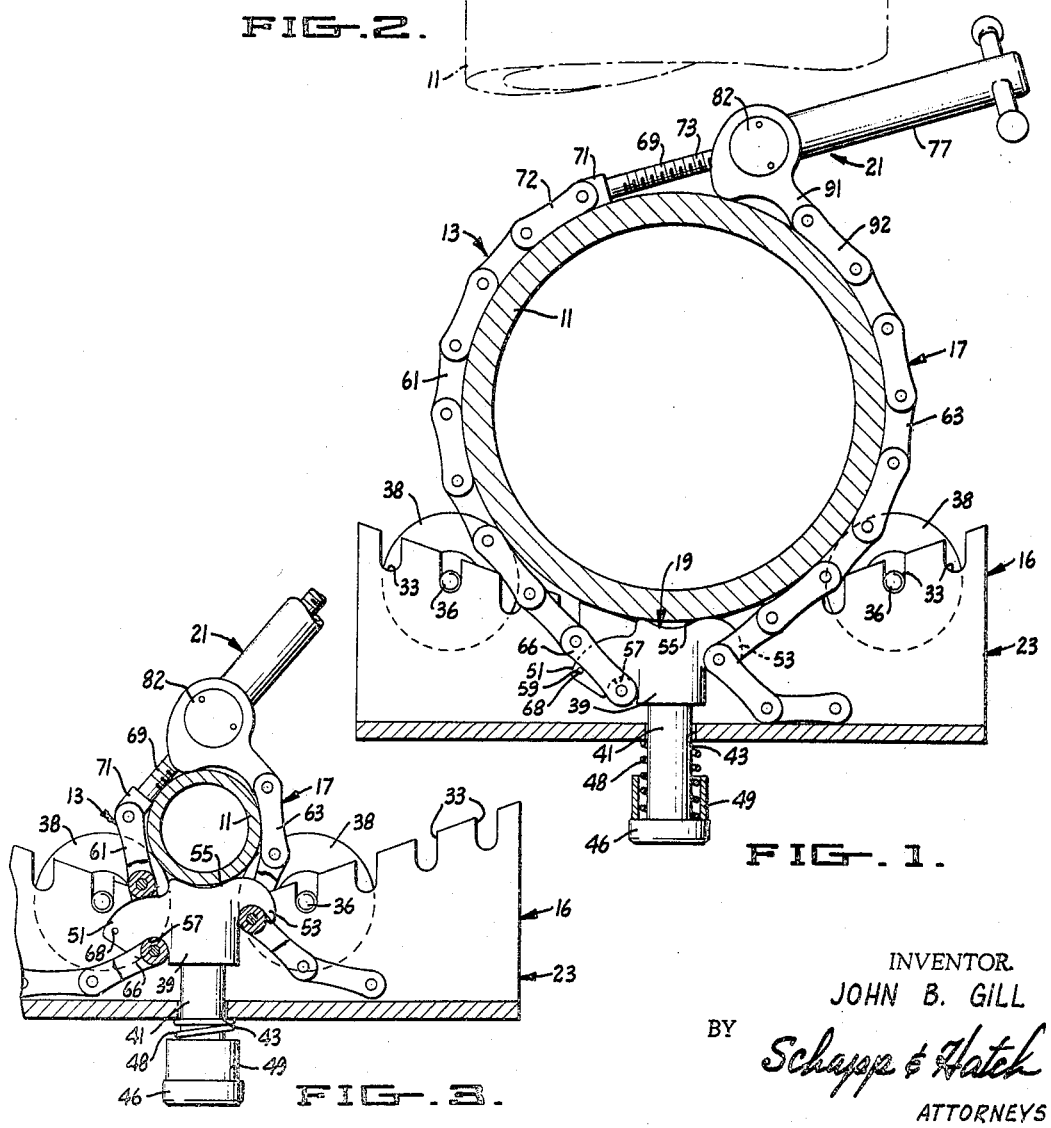
INVENTOR.
JOHN B. GILL
BY Schapp & Hatch
ATTORNEYS Nov. 25, 1969  J. B. GILL  3,480,270
APPARATUS FOR GRIPPING A PIPE
Filed Nov. 19, 1965  2 Sheets-Sheet 2

INVENTOR.
JOHN B. GILL
BY Schapp & Hatch
ATTORNEYS

3,480,270
APPARATUS FOR GRIPPING A PIPE
John B. Gill, 20433 Earl St.,
Torrance, Calif. 90503
Filed Nov. 19, 1965, Ser. No. 508,754
Int. Cl. B25b *13/52, 11/00*
U.S. Cl. 269—131     10 Claims

ABSTRACT OF THE DISCLOSURE

An apparatus for rotatably supporting a pipe and having provision for restraint of the pipe against rotation when desired. This restraint is accomplished by a chain collar adapted to be mounted in encircling relation on the pipe and having tightener means to shorten the length of the collar and make it grip the pipe firmly. The pipe is supported on rollers for rotational movement, and the chain collar is provided with an extension which is slidably engaged in an opening in the cradle support. This structure permits the tightening means to pull the chain into tight engagement with the pipe without translating any of the force into pressing of the pipe against the rollers, which would tend to crush asbestos cement pipes and the like.

---

This invention relates to apparatus for gripping a pipe and more particularly to apparatus for releasably securing or binding a pipe against movement to permit work, such as cutting or machining, for example, to be performed on the pipe.

Briefly, this invention contemplates a bench for supporting a pipe, an elongated gripping means adapted for substantially encircling the pipe and a connector device for securing the gripping means and the pipe clamped therein against unwanted movement relative to the bench. The elongated gripping means includes a tightening mechanism for reducing the overall length of the gripping means to clamp the pipe firmly with substantially evenly distributed compressive forces.

The present invention has been found particularly useful in securing asbestos-cement pipe against movement while work is performed on the pipe. Asbestos-cement pipe, while it has many advantages over metallic pipe, such as being more resistant to corrosion, also has certain disadvantages which become more pronounced when work is to be performed on the pipe. For example, such pipe is more fragile than metal and the application of inwardly directed radial forces or pressure at a few points around the periphery of the pipe, such as might occur when a pipe is placed in a vise, for example, prior to performing work on the pipe, may cause substantial distortion or crushing of the pipe. Both distortion and crushing render the application of tools to the pipe relatively useless since any work performed may be inaccurate due to distortion, or wasted due to a rupture.

It is a principal object of the present invention to provide an apparatus for gripping a pipe in such manner that the gripping force is applied in substantially equal increments completely around the pipe, thereby avoiding injury to or distortion of the pipe.

Another object of this invention is to provide an apparatus of the class described which is adapted for rotatably supporting a pipe when it is desired not to secure the latter against movement, such as when the work tool is to remain stationary and the pipe is to rotate.

A further object of this invention is the provision of apparatus such as described in which, when a pipe is gripped thereby, the gripping forces are applied independently of the rotatable supports, thereby lengthening the life of the latter.

A still further object of this invention is the provision of apparatus of the class described which is readily adjustable for rotatably supporting or for gripping different sizes of pipe, thereby affording great flexibility.

Further objects and advantages of the invention will be apparent as the specification progresses, and the new and useful features of the apparatus for gripping a pipe will be fully defined in the claims attached hereto.

In the accompanying drawings, in which one of various possible embodiments of the invention is illustrated, FIGURE 1 is an elevational view of apparatus constructed in accordance with the present invention and shown in operative position with respect to a section of pipe;

FIGURE 2 is a plan view of FIGURE 1 with the pipe being shown in phantom, and other parts being broken away and shown in section for clarity;

FIGURE 3 is an elevational view similar to FIGURE 1, showing the apparatus as applied to a pipe of much smaller size;

Figure 4:
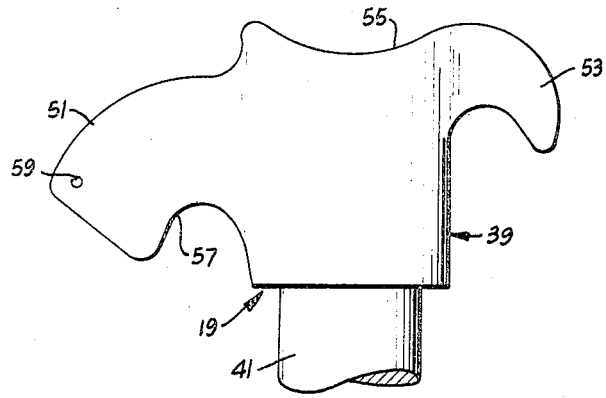
FIGURE 4 is an enlarged fragmentary view of a portion of the apparatus of FIGURE 1.
Figure 6:
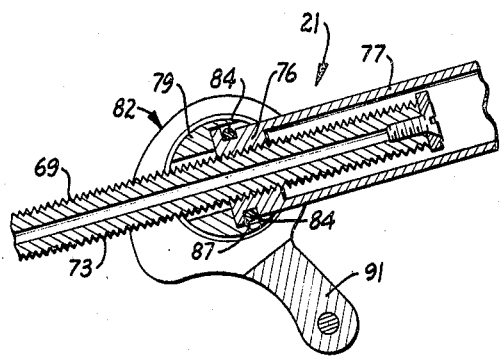
FIGURE 6 is an enlarged section taken along line 6—6 of FIGURE 5.
Figure 5:
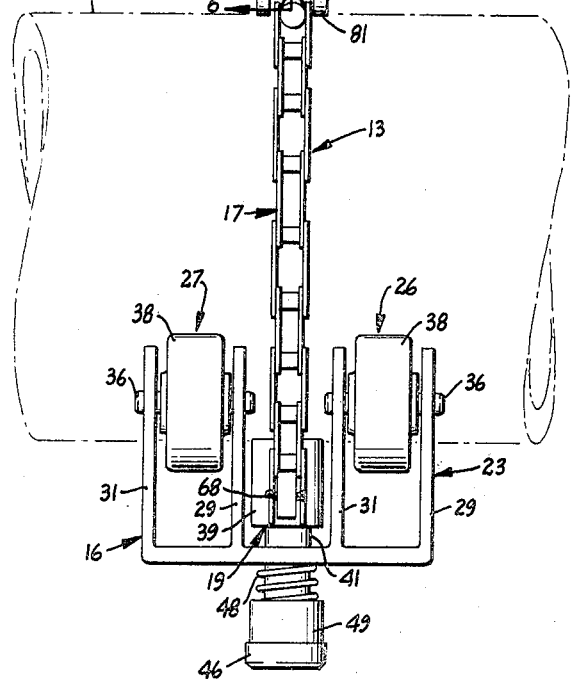
FIGURE 5 is a side elevational view of FIGURE 1 as viewed from the left of FIGURE 1.

Referring now to the drawings, a pipe 11 is shown as being supported and held against movement by apparatus 13 constructed in accordance with the present invention. The apparatus 13 includes a base 16 adapted for supporting the pipe 11, elongated gripping means 17 substantially encircling the pipe, and connecting means 19 on the base for connecting the ends of the gripping means to the base. Gripping means 17 includes tightening means 21 located between the opposite ends thereof for reducing the length of the gripping means to bind the pipe 11 to the base 16.

The base 16 is here shown as comprising a workbench having a generally V-shaped type cradle 23 provided with paired roller supports 26 and 27 spaced apart axially from one another with respect to the pipe 11. Each roller support includes a pair of generally vertical plates 29 and 31 having axially aligned slots 33 therein. The axles 36 of a pair of rollers 38 are journaled in slots 33. The rollers 38 are adapted to rotatively support a pipe resting thereon and are adapted to be moved to any set of slots 33 in the roller supports 26 and 27 for supporting pipes of different sizes.

The connecting means 19 includes an anchor or connector 39 which has a downwardly disposed elongated member 41 passing loosely through a hole 43 in the bench 16. An enlarged head 46 is secured to the lower end of member 41 to prevent the removal of the member 41 upwardly through the hole 43. The connector 39 is biased downwardly by a spring 48 surrounding member 41 and extending between the lower side of bench 16 and head 46. Thus, the connector 19 may be pulled upwardly by tightening the gripping means 17 around a pipe, but a sleeve 49 surrounding spring 48 prevents the latter from being excessively compressed upon itself.

Connector 39 includes two downwardly curved hooks 51 and 53 located on opposite sides of a concave support portion 55. Hook 51 is provided with a pivotal portion 57 and an axially extending hole 59 for a retaining pin.

The elongated gripping means 17 includes two lengths of chain, 61 and 63, such as roller chain, which are adapted to extend substantially around the circumference of the pipe 11. As shown in FIGURE 1, the lower end link 66 of the length of chain 61 is engaged over hook 51, with the roller at the end of the link 66 being located adjacent the hook's pivot portion 57. A cotter key 68 is engageable through hole 59 to act as a retaining pin preventing the inadvertent removal of the link 66 from the hook 51.

The hook 53 is adapted to receive any one of the links of the lengths of chain 63, depending on the size of the pipe 11 which is to be gripped. As shown in FIGURE 1, the end links of the chain 63, beyond the link engaged by hook 53, merely lay on the bench 16 and perform no particular function.

The tightening means 21 securing the chains 61 and 63 together here includes a bolt 69 having a head 71 secured to the end connecting link 72 of the length of chain 61, and a shank 73 threaded into a nut 76 secured inside a tubular member 77. Both shank 73 and tubular member 77 extend through openings in a cylindrical bushing 79 journaled in and extending between two side plates 81 of a securing member 82. The tubular member 77 is secured to the bushing 79 by means of pins 84 which extend axially through the bushing and engage in an annular groove 87 near the inner end of the tubular member 77. The arrangement is such that tubular member 77 may rotate with respect to the securing member 82 but is prevented from moving axially. A handle 88 is provided at the outer end of tubular member 77 for turning the latter.

As shown in FIGURE 1, the tubular member 77 and the bolt 69 extend generally tangentially with respect to a pipe which is being gripped. Securing member 82 has an arm 91 extending therefrom which is attached to a connecting link 92 located at the upper end of the length of chain 63. Rotation of the handle 88 in a clockwise direction causes the tubular member 77 to advance along the shank 73, pulling the chain ends 72 and 92 toward each other with an application of force substantially tangential to the pipe. The bushing 79 being free to rotate with respect to member 82, the pulling forces can be applied to any diameter pipe. Thus it is seen from FIGURE 1 that the chain lengths and associated fittings completely encircle the pipe to form a collar.

When it is desired to support a pipe 11 for rotation about its axis, the rollers 38 are placed in the appropriate slots 29. The length of chain 63 is unhooked from hook 53 and the gripping means 17 is dropped to the left of the pipe, as viewed in FIGURE 1. Connector 19 is forced downwardly to the position shown in FIGURE 4 by gravity and the action of the spring 48. The pipe 11 is then placed on the rollers 38 and can rotate freely thereon.

When it is desired to secure the pipe against rotational and axial movement, the chains 61 and 63 and tightening means 21 are draped over the pipe as shown in FIGURE 1 and one of the links of chain 63 is hooked onto hook 53. Handle 88 is then rotated to draw the upper ends of chains 61 and 63 toward each other. As the handle 88 is turned, the connector 19 is pulled upwardly and support portion 55 engages the pipe. Continued rotation of the handle 88 results in the chains 61 and 63 being pulled taut around the pipe to bind it securely in the grip of the means 17.

It should be noted that as the chains tighten around the pipe the forces applied to the pipe are directed radially inwardly and no load is imposed on the rollers 58 other than the weight of the pipe and the gripping means. Rotational or axial movement of the pipe is resisted solely by the engagement of member 41 with the bench. Also, the operation of the tightening means 21 to draw the chain tight creates a gripping force which is applied in substantially equal increments around the pipe, thus permitting relatively large gripping forces without injury to or distortion of the pipe. The chains are quickly removed from the pipe by loosening the tightening means 21 sufficiently to allow unhooking of section 63 from connector 19.

If it is desired to mount pipes of other diameter in the present apparatus, the rollers are first placed in the appropriate slots 29. Cotter key 68 is removed, the chain 61 is pulled down and the appropriate link is engaged over hook 51, and the cotter key 68 is replaced. The chains 61 and 63 are draped over the pipe and the appropriate length of chain 63 hooked onto hook 53. The tightening means 21 is then operated as described above to bind the gripping means 17 around the pipe and the engagement of member 41 in hole 43 in the bench 16 prevents rotation or axial movement of the pipe.

As various changes could be made in the above constructions without departing from the scope of the invention, it is intended that all matter contained in the above description or shown in the accompanying drawings shall be interpreted as illustrative and not in a limiting sense.

I claim:
1. Apparatus for use with a pipe, comprising
    a base adapted to support a pipe for rotational movement thereon,
    a collar formed for mounting in encircling and gripping relation on the pipe, and
    connecting means associated with said collar and said base for preventing said rotational movement of the pipe on said base while permitting movement of the pipe toward and away from said base.
2. Apparatus as described in claim 1, and wherein said base includes laterally spaced rollers for said support of the pipe for rotational movement.
3. Apparatus as described in claim 2, and wherein said connecting means is formed so that engagement of said connecting means with said collar and said base imposes no material additional urging of the pipe against said rollers.
4. Apparatus as described in claim 1, and wherein said collar comprises first and second lengths of chain, a connector, and a tightening means, the ends of said first and second lengths of chain being formed for releasable attachment to said connector and said tightening means to encircle the pipe.
5. Apparatus as described in claim 4, and wherein said tightening means includes a first member having internal threads, means connecting said first member to one of said lengths of chain for rotation thereto, a second member threaded into said first member, said second member being connected to the other length of chain, and means holding said second member against rotation relative to said other length of chain, said members extending in a generally tangential direction relative to said pipe whereby rotation of said first member in one direction reduces the length of the encircling collar, and rotation of said first member in an opposite direction increases the length of the encircling gripping means.
6. Apparatus as described in claim 3, and wherein said base includes a pair of roller supports spaced apart axially with respect to said pipe, each support being generally V-shaped and having said rollers in opposite sides thereof for supporting said pipe.
7. Apparatus as described in claim 4, and wherein said tightening means includes a rotatable first member connected to one of said lengths of chain, a second member connected to the other length of chain, one of said members having internal threads, and the other member having an externally threaded portion threaded into said one member, said members being connected to said lengths of chain so as to extend generally tangential relative to the pipe around which said lengths of chain pass whereby rotation of said rotatable member in one direction tightens said length of chain around said pipe and rotation of said rotatable member in the other direction loosens said lengths of chain around said pipe.
8. Apparatus for selectively binding a pipe against rotational movement, comprising
    a base for supporting said pipe and to which said pipe is to be bound,
    chain means adapted to extend around said pipe,
    a connector secured to said base and adapted to be connected in hooking engagement with opposite ends of said chain means,
    said chain means including tightening means between opposite ends thereof for shortening the chain means to bind said pipe to said connector;

said chain means including a first length of roller chain having a plurality of links with one of said links being hooked onto one side of said connector, a second length of roller chain having a plurality of links one of which is hooked to the other side of the connector and with both of said lengths of chain being connected to said tightening means;

said tightening means including a rotatable first member connected to one of said lengths of chain, a second member connected to the other length of chain, one of said members having internal threads and the other member having an externally threaded portion threaded onto said one member, said members being connected to said lengths of chain so as to extend generally tangential relative to the pipe around which said length of chain pass whereby rotation of said rotatable member in one direction tightens said lengths of chain around said pipe and rotation of said rotatable member in the other direction losens said lengths of chain around said pipe;

said base comprising a pair of generally V-shaped roller supports spaced apart axially with respect to said pipe, each support comprising a pair of generally vertical plates having a plurality of axially aligned slots therein, and a plurality of rollers for each pair of plates, each of said rollers having outwardly extending axles located in a pair of axially aligned slots.

9. A chain binder for restraining a pipe against substantial motion relative to a support on which said pipe is located, comprising first and second lengths of chain, a connector attached to said support, said connector having chain engaging means for engaging one end of each of said length of chain, tightening means attached to the other end of each of said lengths of chain to join the lengths of chain together around the pipe, said tightening means being adapted to move said other ends of said lengths of chain toward one another for pulling the chain lengths taut in binding relation around the pipe, said support being formed with an opening therthrough in proximity to said connector, and a downwardly extending projection on said connector adapted for slidable engagement in said opening in said support, said projection having means on its lower end preventing withdrawal of said projection from said opening.

10. A chain binder as described in claim 9, and wherein said means on the lower end of said projection comprises an enlarged head, and a spring surrounding said projection between said head and the lower side of said support for biasing said connector downward.

References Cited

UNITED STATES PATENTS

| | | | |
|---|---|---|---|
| 734,427 | 7/1903 | McCarter | 82—38 |
| 2,120,497 | 6/1938 | Heinrich | 269—130 X |
| 2,379,014 | 6/1945 | Lowe | 269—130 X |
| 2,489,535 | 11/1949 | Montague | 269—130 X |
| 3,031,184 | 4/1962 | Spencer | 269—131 X |

ROBERT C. RIORDON, Primary Examiner

U.S. Cl. X.R.

248—231